(12) United States Patent
Beekmann et al.

(10) Patent No.: US 10,027,266 B2
(45) Date of Patent: Jul. 17, 2018

(54) WIND TURBINE GENERATOR SYSTEM AND METHOD FOR OPERATING A WIND TURBINE GENERATOR SYSTEM

(75) Inventors: Alfred Beekmann, Wiesmoor (DE); Wolfgang de Boer, Moormerland (DE)

(73) Assignee: Wobben Properties GmbH, Aurich (DE)

( * ) Notice: Subject to any disclaimer, the term of this patent is extended or adjusted under 35 U.S.C. 154(b) by 551 days.

(21) Appl. No.: 14/007,927

(22) PCT Filed: Mar. 23, 2012

(86) PCT No.: PCT/EP2012/055226
§ 371 (c)(1),
(2), (4) Date: Dec. 6, 2013

(87) PCT Pub. No.: WO2012/130761
PCT Pub. Date: Oct. 4, 2012

(65) Prior Publication Data
US 2014/0084587 A1    Mar. 27, 2014

(30) Foreign Application Priority Data
Apr. 1, 2011    (DE) .................. 10 2011 006 670

(51) Int. Cl.
*H02P 9/04*    (2006.01)
*F03D 7/02*    (2006.01)

(52) U.S. Cl.
CPC .............. *H02P 9/04* (2013.01); *F03D 7/0276* (2013.01); *F05B 2270/20* (2013.01); *F05B 2270/327* (2013.01); *Y02E 10/723* (2013.01)

(58) Field of Classification Search
CPC ...... H02P 9/04; F03D 7/0276; F05B 2270/20; F05B 2270/327; Y02E 10/723
(Continued)

(56) References Cited

U.S. PATENT DOCUMENTS

| 4,313,713 | A | * | 2/1982 | Lois | ........................ | F03D 15/00 |
| | | | | | | 416/11 |
| 7,586,205 | B2 | * | 9/2009 | Krueger | ................ | F03D 7/0276 |
| | | | | | | 290/44 |

(Continued)

FOREIGN PATENT DOCUMENTS

| CL | 1996-1546 | 9/1996 |
| CL | 2011-2340 | 9/2011 |

(Continued)

OTHER PUBLICATIONS

Erlich et al., "Primary frequency control by wind turbines," *IEEE PES General Meeting*, 2010, pp. 1-8.

(Continued)

*Primary Examiner* — Kenneth M Lo
*Assistant Examiner* — Michael J. Huntley
(74) *Attorney, Agent, or Firm* — Seed IP Law Group LLP (57) ABSTRACT

The present invention concerns a method of controlling a wind power installation connected to an electric network having a generator with an aerodynamic rotor with an adjustable rotary speed, in which the wind power installation can be operated at an operating point which is optimum in relation to prevailing wind conditions at an optimum rotary speed, wherein the wind power installation is operated for a transitional period of time or lastingly at a non-optimum operating point at a non-optimum rotary speed and the non-optimum rotary speed is higher than the optimum rotary speed.

18 Claims, 3 Drawing Sheets

(58) Field of Classification Search
USPC .......................................... 290/44; 700/287
See application file for complete search history.

(56) References Cited

U.S. PATENT DOCUMENTS

| | | | |
|---|---|---|---|
| 7,704,043 B2 | 4/2010 | Kabatzke et al. | |
| 9,287,814 B2 * | 3/2016 | Yasugi | F03D 7/0284 |
| 2003/0185665 A1 * | 10/2003 | Hansen | F03D 7/0224 |
| | | | 415/1 |
| 2006/0214428 A1 * | 9/2006 | Altemark | F03D 9/003 |
| | | | 290/44 |
| 2007/0085343 A1 * | 4/2007 | Fortmann | F03D 7/0264 |
| | | | 290/44 |
| 2008/0136188 A1 * | 6/2008 | Krueger | F03D 7/0276 |
| | | | 290/44 |
| 2008/0140263 A1 * | 6/2008 | Wang | F03D 7/028 |
| | | | 700/291 |
| 2010/0133818 A1 * | 6/2010 | Kinzie | F03D 7/0224 |
| | | | 290/44 |
| 2011/0031748 A1 * | 2/2011 | Arinaga | F03D 7/0276 |
| | | | 290/44 |
| 2011/0062708 A1 * | 3/2011 | Prochaska | F02D 29/06 |
| | | | 290/7 |
| 2011/0144814 A1 * | 6/2011 | Menke | F03D 7/026 |
| | | | 700/287 |
| 2012/0104756 A1 | 5/2012 | Beekmann et al. | |
| 2012/0161444 A1 * | 6/2012 | Tarnowski | F03D 7/0276 |
| | | | 290/44 |
| 2014/0084742 A1 | 3/2014 | Gudewer et al. | |

FOREIGN PATENT DOCUMENTS

| | | | | |
|---|---|---|---|---|
| CL | 2013-2815 | 9/2013 | | |
| DE | 100 22 974 A1 | 11/2001 | | |
| DE | 103 41 502 A1 | 3/2005 | | |
| DE | 10 2009 014 012 A1 | 9/2010 | | |
| DK | 1665494 T3 | 6/2012 | | |
| EP | 1 990 539 A1 | 11/2008 | | |
| EP | 2 284 974 A1 | 2/2011 | | |
| EP | 2 492 499 A1 | 8/2012 | | |
| EP | 2767709 A1 * | 8/2014 | ........... | F03D 7/0224 |
| NZ | 316943 A | 11/1998 | | |
| RU | 2 113 616 C1 | 6/1998 | | |
| RU | 2 351 795 C2 | 4/2009 | | |
| WO | 2005/025026 A1 | 3/2005 | | |
| WO | 2011/000531 A2 | 1/2011 | | |

OTHER PUBLICATIONS

Holst et al., "Netzregelverhalten von Windkraftanlagen," *PMA/ETG Conference: Sichere und zuverlässige Systemführung von Kraftwerk und Netz im Zeichen der Deregulierung*, Munich, May 21-22, 2003, pp. 1-15 (with partial English machine translation).

Prillwitz et al., "Primärregelung mit Windkraftanlagen," *ETG Workshop: Neue Dezentrale Versorgungsstrukturen*, Feb. 19-22, 2003, 7 pages (with English machine translation).

Rawn et al., "Wind rotor inertia and variable efficiency: fundamental limits on their exploitation for inertial response and power system damping," *European Wind Energy Conference and Exhibition*, 2008, pp. 2108-2117. (12 pages).

Žertek et al., "Participation of DFIG Wind Turbines in Frequency Control Ancillary Service by Optimized Rotational Kinetic Energy," *Seventh International Conference on European Energy Market*, 2010, pp. 1-6.

* cited by examiner

WIND TURBINE GENERATOR SYSTEM AND METHOD FOR OPERATING A WIND TURBINE GENERATOR SYSTEM

BACKGROUND

Technical Field

The present invention concerns a method of controlling a wind power installation and a corresponding wind power installation.

Description of the Related Art

Wind power installations are generally known and serve to take kinetic energy from the wind and convert it into electric energy to feed that into an electric network. In that respect, wind power installations nowadays also perform the task of supporting the electric network into which they feed.

Thus for example German patent application DE 100 22 974 A1 from the year 2000 (application filed on 22 Nov. 2001) describes frequency-dependent power regulation. In accordance therewith it is proposed that, with a rising network frequency, the power which the wind power installation feeds into the network is reduced as soon as the network frequency has exceeded a limit value.

That takes account of a network situation in which there is a surplus of energy supply, which because of the performance of large power stations, leads to a frequency increase which the invention in accordance with the above-mentioned application DE 100 22 974 A1 addresses.

In the case of an insufficient supply of energy or an increased energy requirement in the network there would be a drop in frequency to which it would ideally be possible to react with an increase in the power which is fed into the network. An increase in the power to be fed in is however difficult to implement by a wind power installation because the wind power installation optimally already feeds into the network the maximum power which can be taken from the wind. In order nonetheless to permit at least a short-term increase in power, it is proposed for example in accordance with German patent application DE 10 2009 014 012 A1 that a short-term increase in power be effected, using the rotational energy stored in the moment of inertia of the rotor generator system. Such a method however is dependent on the rotational energy stored in the rotor generator system.

As further state of the art attention is directed at this point generally to the following publications DE 103 41 502 A1, WO 2011/000531 A2 and WO 2005/025026 A1.

BRIEF SUMMARY

One or more embodiments of the present invention are directed to reducing or overcoming at least one of the above-mentioned problems. In particular the invention seeks to provide a solution which proposes an improved option of network support. The invention at least seeks to propose an alternative solution.

In accordance with one embodiment, there is proposed a method of controlling a wind power installation which is connected to an electric network and which has a generator and an aerodynamic rotor with an adjustable rotary speed. The aerodynamic rotor is to be distinguished from an electrodynamic rotor which is part of the generator. The generator and thus the wind power installation overall is a type in which the rotary speed is adjustable. The rotary speed is therefore not fixedly coupled to the frequency of the electric mains system which can also be synonymously referred to as the electric network, but can be adjusted independently thereof.

Such a wind power installation can and usually is operated at an optimum operating point in relation to the respectively prevailing wind conditions. The prevailing wind conditions relate in particular to the prevailing wind speed, which hereinafter for the sake of simplicity is viewed as the sole feature of the prevailing wind conditions. In reality further conditions would have to be taken into consideration such as for example gustiness of the wind or also the density of the air, which here for the sake of simplicity is disregarded. Thus basically an optimum operating point is to be associated with each wind speed. In that respect, the term optimum operating point is used to mean an operating point at which the wind power installation takes as much energy as possible from the wind and feeds it into the electric network, in which case however at the same time boundary conditions such as in particular stability of the operating point and installation loading like in particular also wear of the installation, are taken into consideration. Such an optimum operating point is characterized in particular—and that is sufficient hereinafter for the purposes of description—by a correspondingly optimum rotary speed and optimum power delivery. In that respect the power delivery concerns that power which is fed into the electric network. That power which the generator delivers in that case can be higher because for example losses are to be subtracted therefrom.

Although such an optimum operating point with an optimum rotary speed exists for basically any wind speed for the respective installation, it is proposed according to one embodiment of the invention that the wind power installation be operated at a non-optimum operating point for a transitional period of time, wherein the rotary speed at that non-optimum operating point, that is to say the non-optimum rotary speed, is greater than the optimum rotary speed of the optimum operating point in respect of the prevailing wind speed.

Such a mode of operation with a higher rotary speed is proposed in particular when it is to be expected or there is a high probability that the wind power installation is to feed additional active power into the network, namely additional active power which goes beyond the active power which could be currently fed into the network, on the basis of the prevailing wind conditions, more specifically in particular wind speed. Namely, for that situation, the wind power installation is operated at a higher rotary speed in particular for a transitional period of time, whereby more kinetic energy is stored both in the aerodynamic rotor and also an electrodynamic rotor of the generator. The transitional period can last in principle from for example 10-30 seconds, 2-10 minutes or also 1-5 hours or 1-5 days. In that case, depending on the respective situation involved, a decision is to be made as to how far operation at a non-optimum operating point for the corresponding length of the transitional period of time is justified. In principle the wind power installation can also be operated permanently at the non-optimum operating point, at an increased rotary speed. It will be noted however that this can have such a detrimental effect on the wind power installation that such permanent operation at the non-optimum operating point would be disproportionate. Technically however it would be possible.

In principle it is possible to operate the wind power installation at a higher rotary speed than the optimum rotary speed without the power fed into the network being reduced in relation to the optimum operating point. That non-optimum operating point can nonetheless be disadvantageous because an increased rotary speed for example results in increased wear. In addition the increased rotary speed can be aerodynamically detrimental in such a way that the operating point is less stable than the optimum operating point.

Possibly that can require increased regulating complication and expenditure and thus an increased use of control members such as adjustment of a torque or rotor angle, which for example can also increase the rate of wear.

Preferably a wind power installation which is gear-less is used. Such a gearless wind power installation has a very high moment of inertia of the rotor of the generator, which can advantageously be used for the storage of kinetic energy. Accordingly more kinetic energy can be stored by an increase in the rotary speed. It is to be observed in that respect that the kinetic energy stored in such a rotating member is proportional to the square of the rotary speed. In the case of a homogenous solid cylinder, the moment of inertia, in relation to which the stored energy is proportional, increases with the radius at the power of four. A solid cylinder of a diameter of two meters therefore has a 16-times moment of inertia in comparison with a solid cylinder of the same material and the same length and of a diameter of one meter. That clearly shows that a gear-less wind power installation can store a great deal of kinetic energy and that stored kinetic energy can be increased once again in over-proportional relationship by increasing the rotary speed.

In an embodiment it is proposed that a first operating characteristic is stored in the wind power installation in the part-load range for adjustment of a respectively optimum operating point. The wind power installation can set a respective optimum operating point on the basis of that operating characteristic. For that purpose the operating characteristic can be stored in the form of a rotary speed-power characteristic. Implementation can be effected in such a way that the rotary speed is measured and a respective power is set in relation to thereto, in accordance with the operating characteristic. If for example more power can be taken from the wind the rotary speed further increases and a correspondingly new power value is set in accordance with the operating characteristic. The power can be adjusted by means of adjustment of the torque of the generator. Adjustment of the torque depends on the type of installation. If for example a synchronous generator with a direct current-excited rotor is used then the torque is adjusted by way of the corresponding direct current for adjustment of the excitation effect.

Such an optimum operating characteristic is basically a concatenation of many optimum operating points which are respectively optimum for a prevailing wind condition, in particular a prevailing wind speed. According to the present application therefore the operating point for the respectively prevailing wind condition or wind speed is to be interpreted as a or the optimum operating point—which also applies in corresponding fashion to a or the non-optimum operating point. The optimum operating point is therefore not a single absolute operating point for the wind power installation for any conditions, but only one of many for the respectively currently prevailing wind condition.

Such an operating characteristic is stored in particular for the part-load mode of operation. In the part-load mode of operation of a variable-speed wind power installation which is involved here, the rotor blade angle, insofar as it is adjustable, is usually kept constant independently of the wind conditions, namely the wind speed, for that part-load mode of operation. It is only adjustment of the respectively applicable operating point, namely power and rotary speed, that is effected, as described above. In order to set an increased rotary speed in the part-load range for a transitional period of time, it is proposed that operation be based on a second, non-optimum operating characteristic, instead of a first, optimum operating characteristic. Then, based on that non-optimum operating characteristic, a higher rotary speed is set, preferably with the same power as in the case of the corresponding optimum operating point. That second operating characteristic is thus a concatenation of many non-optimum operating points which each involve a higher rotary speed than the corresponding optimum operating points. Implementation of operation of the wind power installation at an increased rotary speed can thus be effected in a simple fashion in the part-load range by storing a corresponding second operating characteristic.

In addition in a further configuration it is proposed that with a falling wind speed in the transition from the full-load mode of operation to the part-load mode of operation the power is firstly reduced, in particular for a predetermined wind speed range, while the rotary speed is kept constant. The full-load mode of operation is that in which the wind speed has reached the value of the nominal wind speed and the wind power installation is operated in the optimum case at nominal power and nominal rotary speed. If the rotary speed rises further there is a change in the rotor blade angle, so-called pitch control, to worsen the aerodynamics of the rotor in order to take less energy from the wind in order thereby to counteract the further increase in rotary speed. If now the wind speed drops again so that the wind power installation goes from the full-load mode into the part-load mode again it is proposed here that firstly only the power is reduced, but the rotary speed is not yet reduced or is reduced to a lesser extent than is usual. Initially not reducing the rotary speed means insofar as that is first reduced when the wind speed drops below the nominal wind speed by a predetermined value. Initially not reducing the rotary speed is not to be interpreted in that respect from the point of view of time.

In an embodiment it is also proposed that in the full-load mode of operation for a transitional period of time the wind power installation is operated at a rotary speed higher than the nominal rotary speed. Such a mode of operation at an increased rotary speed can adversely affect the service life of the wind power installation and should therefore be kept as short as possible. The transitional period of time should therefore be kept as short as possible such as for example only 10 minutes or only 1 minute.

It is desirable if the wind power installation has a rotor blade or a plurality of rotor blades having an adjustable rotor blade angle and the rotor blade angle of the non-optimum operating point is respectively altered relative to the rotor blade angle of the optimum operating point. The use of a wind power installation having one or more rotor blades with an adjustable rotor blade angle also describes in that respect one type of installation. The expression adjustment of the rotor blade angle is used to denote active, deterministic adjustment of the rotor blade angle. In other words, this concerns adjustment of the rotor blade angle by means of a motor or other actuator. Preferably the wind power installation has a horizontal or substantially horizontal rotor axis. This expression horizontal rotor axis is also used to denote a type of installation, namely a so-called horizontal-axis wind power installation. That also embraces a slightly tilted angle for the rotor axis with respect to the horizontal, through a few degrees such as for example about 5° or 10°.

Adjustment of a higher rotary speed in relation to the optimum rotary speed is thus effected by or by means of suitable rotor blade angle adjustment. Thus the non-optimum operating characteristic in the part-load mode of operation can involve a different rotor blade angle from that which is the case for the optimum operating characteristic.

Regulation in which the rotor blade angle is not presupposed as constant can also be adopted for the non-optimum operating characteristic, as a departure in relation to a known and also stored optimum operating characteristic, in the part-load mode of operation.

Preferably, a change is made from a mode of operation at the optimum operating point to a mode of operation at the non-optimum operating point. That is proposed in particular for the situation where it is expected that increased kinetic energy could be used. The change can preferably be triggered by the reception of a notification signal or change signal. Such a notification or change signal can be transmitted by an external network operator. The network operator can for example transmit such a signal if he sees a need arising to support the electric network. Thus for example particular situations are known, which can lead to a critical network condition or which can indicate a critical network condition. For example the interruption in a transmission line of the electric network, which is temporarily effected for example for repair purposes or for other reasons, can put the electric network into a critical condition. In that situation the network operator can communicate such a notification or change signal to the wind power installation or a wind park having a plurality of wind power installations.

Preferably it is proposed that when the wind power installation is operated at the non-optimum operating point, kinetic energy is taken from the wind power installation and that energy is used to temporarily feed more active power into the electric network than the wind power installation can take from the currently prevailing wind, on the basis of the prevailing wind condition. Thus the kinetic energy stored by the wind power installation operated at an increased rotary speed is used to support the electric network.

Preferably it is proposed for that purpose that that kinetic energy is taken from the wind power installation in such a way that the rotary speed of the wind power installation is reduced from the non-optimum rotary speed to the optimum rotary speed by the kinetic energy being taken from the wind power installation for feeding the additional active power into the electric network. Preferably the rotary speed is reduced still further than the optimum rotary speed. Thus with the additional stored kinetic energy, the additional active power can first be fed into the network for supporting it, and thus more than can be taken from the wind at the present time.

Preferably the non-optimum rotary speed is about 0.5 to 1.5 rpm higher than the optimum rotary speed. Further preferably it is about 1 rpm higher than the optimum rotary speed. In that way a significant increase in rotary speed and together therewith a significant increase in kinetic energy can be proposed, without the wind power installation being operated at a too unfavorable operating point, in particular without reaching a high level of wear and without entailing an excessively high risk in regard to the stability of the wind power installation.

One embodiment of the invention thus concerns a method of controlling a wind power installation. In that respect such a control method includes control generally, which more specifically can involve a feedback in order thereby to form a regulating system, or which can manage without a feedback. In other words regulation is control with feedback and thus embraces a control. The term control is used as a generalized term.

According to one embodiment of the invention there is also proposed a wind power installation comprising an electric generator and an aerodynamic rotor with an adjustable rotary speed which is operated with a method according to the invention. Preferably in that respect a gear-less wind power installation is used.

In an embodiment it is proposed that the wind power installation is FACTS-capable. The designation FACTS stands for "flexible-AC-transmission-system" and is also usual in German linguistic usage for the man skilled in the art. That expression is used in electric energy technology to denote a control system which is employed in power supply networks for specifically influencing power flows. In particular such a system is capable of feeding active power and/or reactive power into a network in specifically targeted fashion. In addition such a feed can be effected in dependence on measurements in the network in order thereby to react for example directly to changes in frequency. Thus there is proposed a wind power installation which can advantageously be used for network support. The option of providing an increased rotary speed for a transitional period of time affords the option of providing increased energy in the form of kinetic energy for supporting the network. In that way such a network-supporting system can provide additional active power for support purposes and can feed it into the electric network as required.

Preferably the wind power installation has at least one converter which rectifies produced electric energy of the generator and converts it to AC again for feed thereof into the electric network in order thereby to effect adaptation to frequency, voltage and phase of the electric network. A wind power installation with one or more such converters, in respect of which—apart from losses—all the electric energy produced is passed through the one or more converters, is also referred to as a so-called full-converter system.

According to another embodiment of the invention there is also proposed a wind park having at least two wind power installations with a control method according to the invention. A wind park is in that respect an array of a plurality of wind power installations which are coupled, and which in particular have a common feed-in point or a plurality of common feed-in points for feeding electric energy into the electric network. The advantages described in relation to the method according to the invention and the wind power installation according to the invention can be consolidated by that wind park in order thereby to be able to provide a significantly high reserve power.

BRIEF DESCRIPTION OF THE SEVERAL VIEWS OF THE DRAWINGS

The invention is described by way of example hereinafter by means of embodiments with reference to the accompanying Figures.

DETAILED DESCRIPTION

Figure 1:
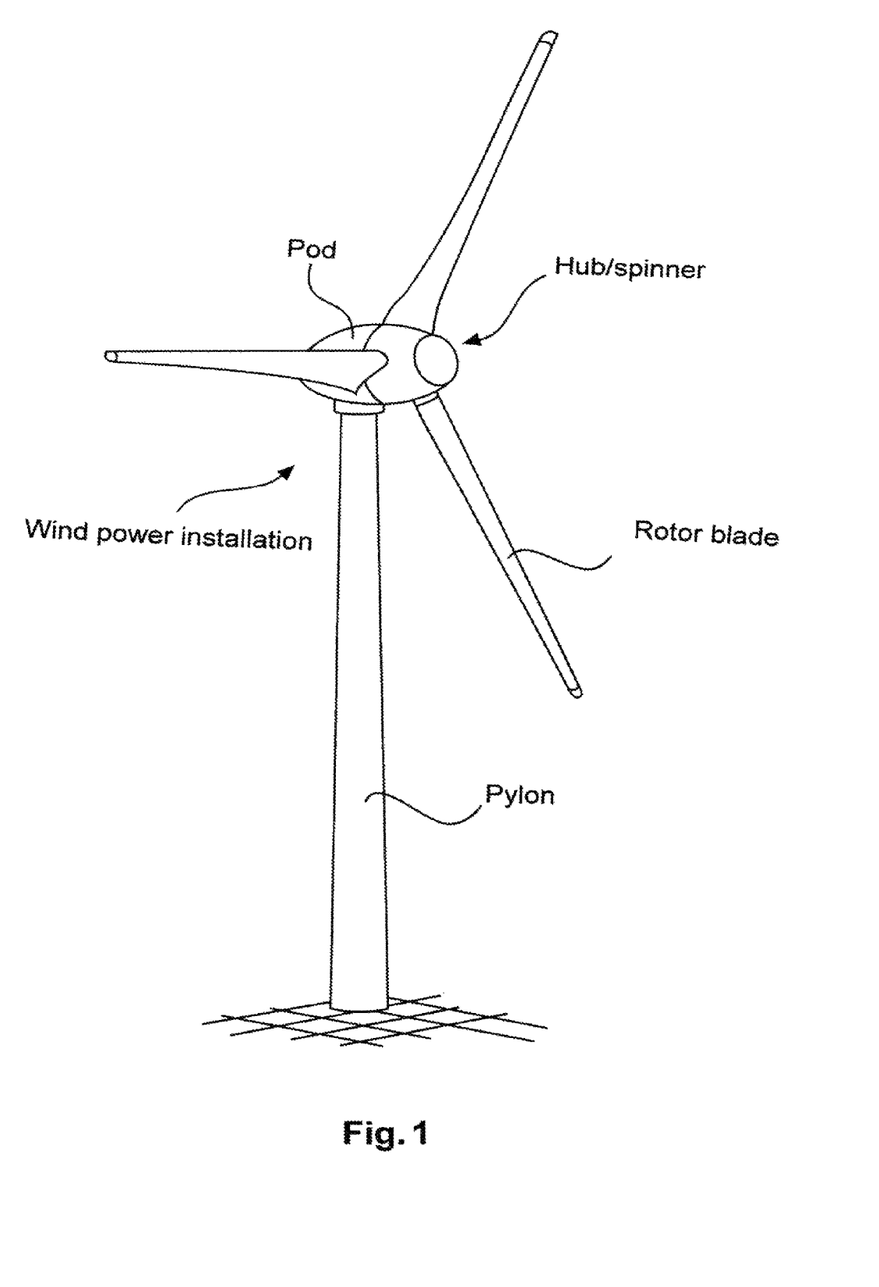
FIG. 1 shows a horizontal-axis wind power installation.

FIG. 1 shows a horizontal-axis wind power installation as is known in principle from the state of the art. According to the invention that horizontal-axis wind power installation in FIG. 1 is equipped with a method, namely an operational management method, according to the present invention. Generally described and as shown by FIG. 1, the wind power installation includes a pylon and a pod located on the pylon. A hub/spinner is rotatably coupled to the pod and at least one rotor blade is coupled to the hub/spinner.

Figure 2:
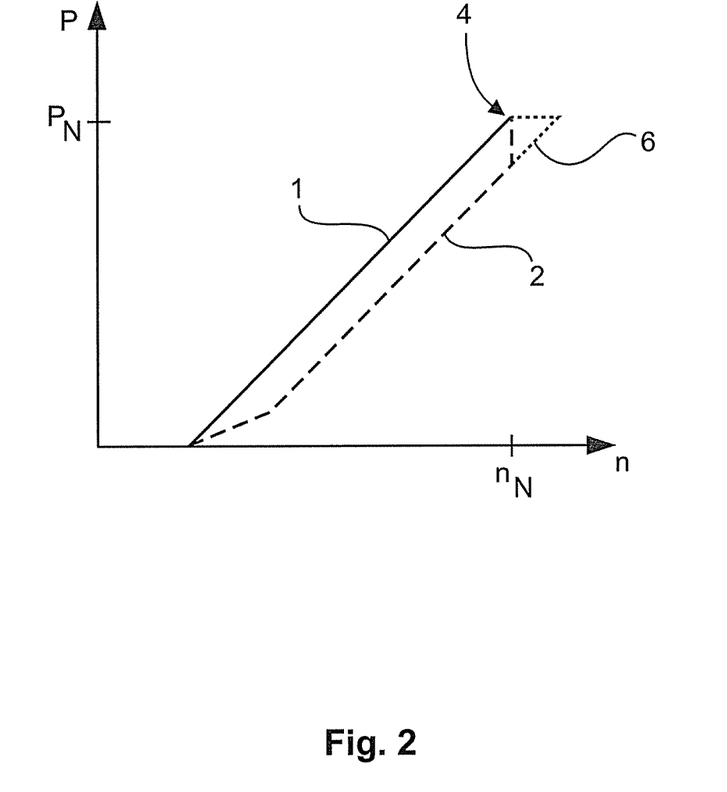
FIG. 2 shows a diagram with two rotary speed-power characteristics.

FIG. 2 diagrammatically shows two operating characteristics, namely two rotary speed-power characteristics. That diagram shows an optimum operating characteristic 1 as a solid line and a non-optimum operating characteristic 2 as a broken line. The two operating characteristics 1 and 2 represent only a diagrammatic configuration which can deviate from the real configuration. In particular the real configuration can deviate from the simplified straight-line representation. That representation is intended substantially to illustrate the relationship between the optimum operating characteristic 1 and the non-optimum operating characteristic 2. Moreover that also applies to the diagrams in FIG. 3 which can also be greatly simplified in relation to a real configuration.

It can now be seen from the diagram in FIG. 2 that the non-optimum operating characteristic 2 involves a higher rotary speed n in each case, in comparison with the optimum operating characteristic 1, at equal power P. An increase in the rotary speed in relation to the respectively optimum rotary speed can thus be achieved by using the non-optimum operating characteristic 2 instead of the optimum operating characteristic 1.

The two operating characteristics 1 and 2 meet at the nominal point 4 at which the wind power installation is operated at the nominal rotary speed $n_N$ and the nominal power $P_N$. That nominal point or nominal operating point 4 can be operated as from the attainment of a nominal wind speed. Neither the power P nor the rotary speed n should be increased therebeyond to avoid overloading the installation. Nonetheless at least for a short period of time it may be reasonable nevertheless to increase the rotary speed n. That is illustrated by an alternative characteristic portion 6 which is plotted in the form of a dotted line.

Figure 3:
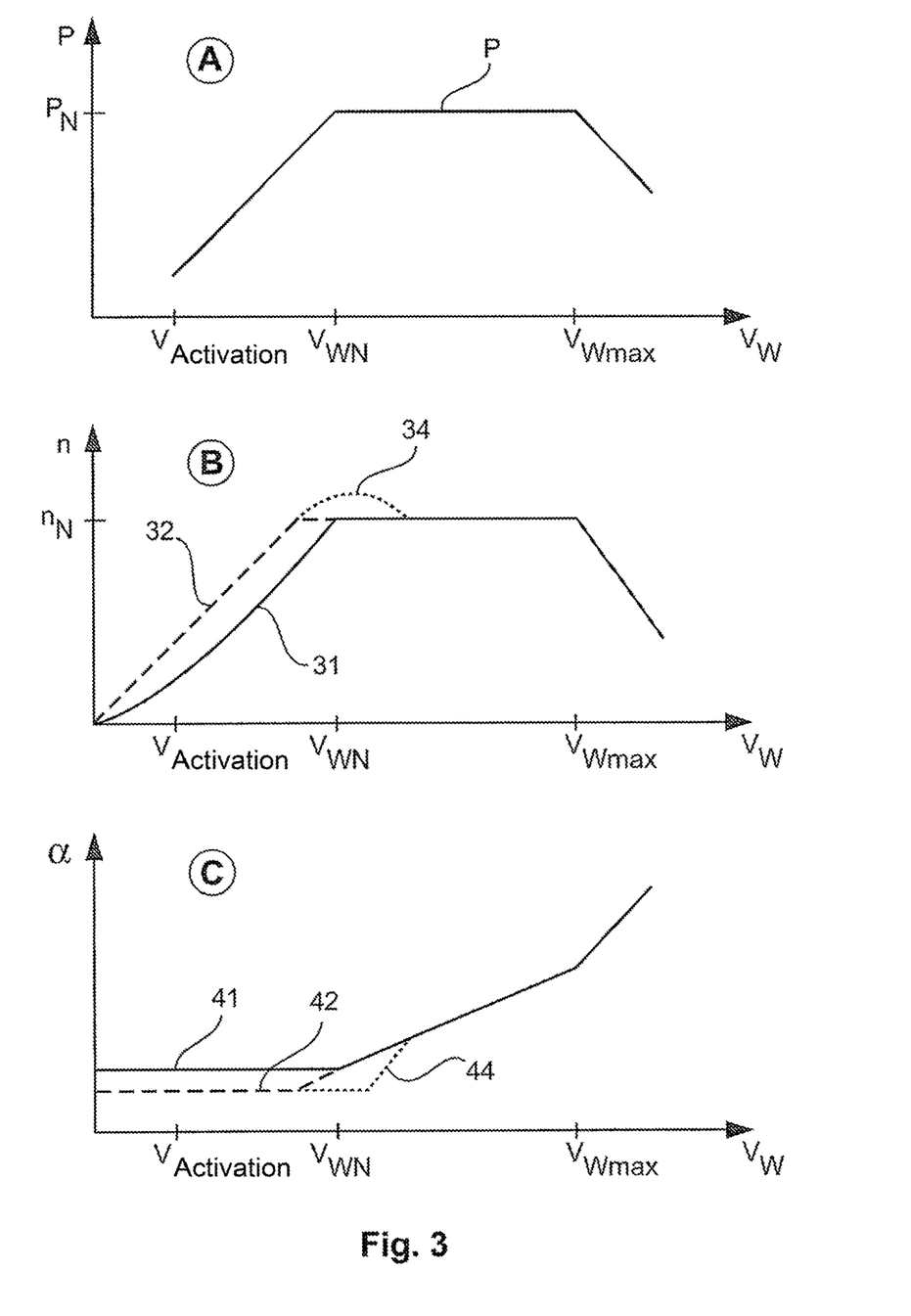
FIG. 3 shows three wind speed-dependent diagrams.

FIG. 3 shows three diagrams to illustrate operational management of a wind power installation. All three diagrams respectively represent an operating parameter in dependence on the wind speed $V_W$, namely the delivered power P in diagram A, the rotary speed n of the wind power installation, namely of the aerodynamic rotor in diagram B, and the rotor blade angle α in diagram C. All diagrams involve the same abscissa on which the wind speed is plotted.

Diagram A shows a characteristic variation in the power P in dependence on the wind speed $V_W$. Power production begins at the cut-in wind speed $V_{Activation}$. The power P rises to the nominal power $P_N$ at the nominal wind speed $V_{WN}$. That region is also referred to as a part-load region. From the nominal wind speed $V_{WN}$ to the maximum wind speed $V_{Wmax}$ the delivered power P remains constant and the wind power installation delivers nominal power $P_N$. From the maximum wind speed $V_{Wmax}$ the power P is reduced to protect the installation, with the wind speed $V_W$ further increasing. With the increase in rotary speed the power ideally remains unchanged at least in accordance with one embodiment, and in that respect diagram A shows only a characteristic for the power P, which applies for the use of optimum operating points and also non-optimum operating points. In an embodiment the power of the respectively optimum operating point however can differ from the power of the corresponding non-optimum operating point and in particular can be somewhat greater.

Diagram B diagrammatically shows the variation in the rotary speed n as an optimum rotary speed characteristic 31 shown with a solid line, and the configuration of a non-optimum rotary speed characteristic 32 shown as a broken line. The two rotary speed characteristics 31 and 32 correspond to the power characteristic P of the diagram A, in which respect it is also repeated in this connection that the representations are diagrammatic and idealized in order to better to illustrate the notion of the invention.

As shown in diagram B in FIG. 3 the rotary speed in accordance with the non-optimum rotary speed characteristic 32 is thus above the rotary speed in accordance with the optimum rotary speed characteristic 31 until the nominal wind speed $V_{WN}$ is reached—that is to say in the part-load range. When the nominal wind speed $V_{WN}$ is reached the installation reaches its operating point and thus the rotary speed n attains the nominal rotary speed $n_N$ both in accordance with the optimum rotary speed characteristic 31 and also the non-optimum rotary speed characteristic 32 shown in broken line. Alternatively it can be provided that the rotary speed n is still to be increased above the nominal rotary speed $n_N$, as indicated by the alternative characteristic branch 34 shown in dotted line. In that case, at least for a given period of time, overloading of the wind power installation by a correspondingly high rotary speed is tolerated.

Otherwise the rotary speeds n of the optimum and non-optimum mode of operation are the same in the full-load range or in the full-load mode of operation, that is to say from the wind speed $V_{WN}$ to the maximum wind speed $V_{Wmax}$, they more specifically involve the nominal rotary speed $n_N$. They are also the same for the so-called storm region, namely for wind speeds of greater than the maximum wind speed $V_{Wmax}$.

A variation in the rotor blade angle α as shown in diagram C can form the basis for the power variation shown in principle in diagram A and the rotary speed variation shown in diagram B. Diagram C also shows the illustrated variations diagrammatically. An optimum rotor blade angle characteristic 41 is shown in diagram C by a solid line. It extends horizontally in the part-load range or part-load mode of operation, that is to say up to the nominal wind speed $V_{WN}$, and therefore the rotor blade angle remains unchanged here. In the full-load range or the full-load mode of operation, that is to say from the nominal wind speed $V_{WN}$, the rotor blade angle is increased to turn the rotor blades out of the wind for protection purposes. From the attainment of the maximum wind speed $V_{Wmax}$ there is a further and in particular greater adjustment of the rotor blade angle to further protect the installation. Instead of an increase in the rotor blade angle, ways of representing a reduction in the rotor blade angle for the full-load mode of operation are also known; that however does not describe a different effect, but only involves a difference in nomenclature. Adjustment of the rotor blade angle in the full-load mode of operation, which is generally referred to as pitch control, is basically known to the man skilled in the art.

The non-optimum rotor blade angle characteristic 42 is shown in broken line and in the part-load range shows a somewhat smaller rotor blade angle than the optimum rotor blade angle characteristic 41 in the same range. That smaller rotor blade angle can initially be viewed as "unfavorable". A higher rotary speed can then be reached by virtue of a lower level of torque, namely a counter-moment. A lower generator moment which correspondingly also represents a counter-moment means that it is possible to give a higher rotary speed—as shown in diagram B—, which in turn can lead to an altered afflux flow angle. The afflux flow angle more specifically depends not only on the wind speed $V_W$ but also the speed of the rotor and is vectorially composed of those two speeds. Moreover attention is directed to the generally known relationship between power P, rotary speed n and torque N in accordance with the following formula:

$$P=2\pi nN.$$

When the nominal wind speed $V_{WN}$ is reached the rotor blade angle in accordance with the non-optimum rotor blade characteristic 42 is equal to the rotor blade angle of the optimum rotor blade angle characteristic 41. If a higher rotary speed than the nominal speed is to be used in the region of the nominal wind speed $V_{WN}$ the rotor blade angle, upon the attainment of the nominal wind speed $V_{WN}$, would initially not be increased—it would not be pitch-controlled—, as is shown by the alternative characteristic branch 44 shown as a dotted line. As described hereinbefore in that case overloading of the installation can be tolerated at least for a certain period of time.

According to one embodiment of the invention therefore it is proposed for a transitional period that the wind power installation be operated with an at least slightly increased rotary speed to have a given energy reserve available as kinetic energy.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling a wind power installation connected to an electric network, the wind power installation having a generator and an aerodynamic rotor with an adjustable rotary speed, the method comprising:
    setting, in a part-load mode that is below a nominal rotary speed of the wind power installation, an optimum rotary speed based on a first operating characteristic of the wind power installation;
    setting, in the part-load mode, a non-optimum rotary speed based on a second operating characteristic of the wind power installation, the non-optimum rotary speed being higher than the optimum rotary speed;
    operating the wind power installation at an operating point that is optimum in relation to prevailing wind conditions at the optimum rotary speed; and
    for a transitional period of time, operating the wind power installation at a non-optimum operating point at the non-optimum rotary speed;
    for the transitional period of time, providing an output power that is the same as an output power provided when the wind power installation is operated at the optimum operating point and the optimum rotary speed; and
    with a falling wind speed during a transition from a full-load mode of operation to the part-load mode of operation, reducing the output power and keeping the rotary speed constant.

2. The method according to claim 1, further comprising: in the part-load mode of operation, storing the first operating characteristic.

3. The method according to claim 1 wherein the wind power installation includes at least one rotor blade that is configured to be adjusted to a rotor blade angle, the method further comprising adjusting the at least one rotor blade angle from a first rotor blade angle of the optimum operating point to a second rotor blade angle of the non-optimum operating point.

4. The method according to claim 1 further comprising receiving a notification signal, and in response to receiving the notification signal, operating the wind power installation at the non-optimum operating point.

5. The method according to claim 1 wherein when the wind power installation is operated at the non-optimum operating point, kinetic energy is generated by the wind power installation, said kinetic energy is used to provide more power to the electric network than the wind power installation would generate from currently prevailing wind on the basis of the prevailing wind conditions.

6. The method according to claim 5 wherein the rotary speed of the wind power installation is reduced from the non-optimum rotary speed to the optimum rotary speed when the kinetic energy is provided to the electric network.

7. The method according to claim 1 wherein the non-optimum rotary speed is 0.5 to 1.5 revolutions per minute higher than the optimum rotary speed.

8. The method of claim 1 further comprising:
    determining a desire for an increased demand of power from the electric network coupled to the wind power installation; and
    in response to determining the desire for the increased demand of power, for the transitional period of time, operating the wind power installation at the non-optimum operating point at the non-optimum rotary speed.

9. The method of claim 1, wherein an additional kinetic energy is generated based on the non-optimum rotary speed and the optimum rotary speed and stored as an inertia of the rotor.

10. A wind power installation comprising:
    an electric generator; and
    an aerodynamic rotor with an adjustable rotary speed, the rotor being configured to operate at an operating point that is optimum in relation to prevailing wind conditions at an optimum rotary speed, the rotor further being configured to operate for a transitional period of time at a non-optimum operating point at a non-optimum rotary speed, the non-optimum rotary speed being higher than the optimum rotary speed, the optimum rotary speed being set, in a part-load mode that is below a nominal rotary speed of the wind power installation, based on a first operating characteristic of the wind power installation and the non-optimum rotary speed being set in the part-load mode based on a second operating characteristic of the wind power installation, and the wind power installation being configured to, for the transitional period of time, provide an output power that is the same as an output power provided when the wind power installation is operated at the optimum operating point and the optimum rotary speed, and the wind power installation being configured to reduce the output power and keep the rotary speed constant with a falling wind speed during a transition from a full-load mode of operation to the part-load mode of operation.

11. The wind power installation according to claim 10 wherein the aerodynamic rotor is coupled to the electric generator without a gear assembly being provided therebetween.

12. The wind power installation according to claim 10 wherein the wind power installation is FACTS-capable and has one or more converters for rectifying produced electric energy of the generator and converting to the electric energy into an AC signal for providing to an electric network in adapted relationship to frequency, voltage and phase in the electric network.

13. The wind power installation of claim 10, wherein an additional kinetic energy is generated based on the non-optimum rotary speed and the optimum rotary speed and stored as an inertia of the rotor.

14. A wind park comprising:
a plurality of wind power installations, each wind power installation having an electric generator and an aerodynamic rotor with an adjustable rotary speed, the rotor being configured to operate at an operating point that is optimum in relation to prevailing wind conditions at an optimum rotary speed, the rotor further being configured to operate for a transitional period of time at a non-optimum operating point at a non-optimum rotary speed, the non-optimum rotary speed being higher than the optimum rotary speed, the optimum rotary speed being set, in a part-load mode that is below a nominal rotary speed of the wind power installation, based on a first operating characteristic of the wind power installation and the non-optimum rotary speed being set in the part-load mode based on a second operating characteristic of the wind power installation, and the wind power installation being configured to, for the transitional period of time, provide an output power that is the same as an output power provided when the wind power installation is operated at the optimum operating point and the optimum rotary speed, and the wind power installation being configured to reduce the output power and keep the rotary speed constant with a falling wind speed during a transition from a full-load mode of operation to the part-load mode of operation; and
an electric network that includes a common node for receiving electric power from the plurality of wind power installations.

15. The wind park according to claim 14, wherein the aerodynamic rotor is coupled to the electric generator without a gear assembly being provided there between.

16. The wind park according to claim 14, wherein the rotary speed of the wind power installation is reduced from the non-optimum rotary speed to the optimum rotary speed when kinetic energy is provided to the electric network.

17. The wind park according to claim 14, wherein when the wind power installation is operated at the non-optimum operating point, kinetic energy is generated by the wind power installation, said kinetic energy is used to provide more power to the electric network than the wind power installation would generate from currently prevailing wind on the basis of the prevailing wind conditions.

18. The wind park of claim 14, wherein an additional kinetic energy is generated based on the non-optimum rotary speed and the optimum rotary speed and stored as an inertia of the rotor.

* * * * *